(12) United States Patent
Mack (10) Patent No.: US 10,442,670 B2
(45) Date of Patent: Oct. 15, 2019

(54) RESTAURANT SYSTEM (71) Applicant: ROLLERCOASTERRESTAURANT GMBH & CO. KG, Vienna (AT)

(72) Inventor: Michael Mack, Nuremberg (DE)

(73) Assignee: ROLLERCOASTERRESTAURANT GMBH & CO. KG, Vienna (AT)

( * ) Notice: Subject to any disclaimer, the term of this patent is extended or adjusted under 35 U.S.C. 154(b) by 7 days.

(21) Appl. No.: 15/755,668

(22) PCT Filed: Aug. 31, 2016

(86) PCT No.: PCT/IB2016/001461
§ 371 (c)(1),
(2) Date: Feb. 27, 2018

(87) PCT Pub. No.: WO2017/037545
PCT Pub. Date: Mar. 9, 2017

(65) Prior Publication Data
US 2019/0047838 A1    Feb. 14, 2019

(30) Foreign Application Priority Data

Sep. 2, 2015 (DE) .................. 10 2015 011 538

(51) Int. Cl.
*A47G 23/08* (2006.01)
*A47F 10/06* (2006.01)
(Continued)

(52) U.S. Cl.
CPC .......... *B67D 1/0041* (2013.01); *A47G 23/08* (2013.01); *B25J 9/0093* (2013.01); *B25J 9/0096* (2013.01);
(Continued)

(58) Field of Classification Search
CPC ........ A47F 10/06; B67D 1/0041; A47G 23/08
See application file for complete search history.

(56) References Cited

U.S. PATENT DOCUMENTS 6,459,919 B1 * 10/2002 Lys ...................... A61N 5/0616
                                                       315/291
7,577,498 B2 * 8/2009 Jennings ................ B25J 9/0084
                                                       141/100
(Continued)

FOREIGN PATENT DOCUMENTS

DE    10 2013 012674    9/2014
DE    10 2013 102687    9/2014
(Continued)

OTHER PUBLICATIONS

PCT/IB2016/001461, International Search Report and Written Opinion dated Feb. 22, 2017, 10 pages—English, 12 pages—German.
Anne Leo: "DMaF robot making cocktails", Aug. 14, 2014, pp. 1-2, XP054977132, https://www.youtube.com/watch?v+8B_Eam tk-x0 (retrieved on Feb. 6, 2017).
(Continued)

*Primary Examiner* — Thomas Randazzo
(74) *Attorney, Agent, or Firm* — Lackenbach Siegel, LLP; Andrew F. Young (57) ABSTRACT

A restaurant system includes a work area for cooking and preparing food or beverages and at least one hospitality area; the work area and the hospitality area are connected by means of at least one conveying system designed to convey food from the work area to the hospitality area in dedicated conveying devices; the conveying system having rails, in particular sliding rails, preferably sliding rails having a sliding surface, or tracks or roller conveyors or tubes for conveying the food and/or beverages; in the dedicated conveying device, the food is provided with at least one unique electronically readable identifier created in the work area, and the conveying system includes at least one distribution section which is located downstream of the work area and in which the food is conveyed on the conveying devices onto an additional conveying system by means of an automatic distribution device in a targeted manner on the basis (Continued)

of the identifier in order for the food to be conveyed from the distribution section to the hospitality zone.

14 Claims, 5 Drawing Sheets

(51) Int. Cl.
*B25J 9/00* (2006.01)
*B67D 1/00* (2006.01)
*G06Q 10/04* (2012.01)
*G06Q 30/06* (2012.01)
*G06Q 50/12* (2012.01)
*B65G 1/06* (2006.01)

(52) U.S. Cl.
CPC ....... *G06Q 10/043* (2013.01); *G06Q 30/0603* (2013.01); *G06Q 50/12* (2013.01); *A47F 10/06* (2013.01); *B65G 1/06* (2013.01)

(56) References Cited

U.S. PATENT DOCUMENTS

| | | | |
|---|---|---|---|
| 2009/0101445 A1* | 4/2009 | Mack | A47F 10/06 186/38 |
| 2011/0084614 A1* | 4/2011 | Eisele | H05B 33/0857 315/152 |

FOREIGN PATENT DOCUMENTS

| | | |
|---|---|---|
| DE | 10 2013 102688 | 9/2014 |
| JP | 2007 167475 | 7/2007 |
| WO | WO2007/068426 | 6/2007 |
| WO | WO 2014/167499 | 10/2014 |

OTHER PUBLICATIONS

Anonymous: "RX160 series industrial robots", Oct. 1, 2007, XP055342760, www.rixan.com/portals/0/Staubli; Brochures/Staubli RX160.pdf, retrieved on Jan. 7, 2017.

* cited by examiner

RESTAURANT SYSTEM

CROSS REFERENCE TO RELATED APPLICATIONS

This application relates to, and claims priority from, PCT Ser. No. PCT/IB2016/001461 filed Aug. 31, 2016, the entire contents of which are incorporated fully by reference, which in turn claims priority from DE Ser No. 10 2015 011 538.3 filed Sep. 2, 2015.

FIGURE SELECTED FOR PUBLICATION

FIG. 1

BACKGROUND OF THE INVENTION

Field of the Invention

The present invention relates to restaurant system (also gastronomy system). More particularly, the present invention provides a restaurant system comprising an automated system for distribution from a distribution section to a hospitality zone. Further applications of a restaurant system at minimum comprises a work area for cooking and/or preparing food and/or beverages and at least one hospitality area, wherein the work area and hospitality area are connected by means of a conveyance system for food and/or beverages, and wherein the conveyance system is designed to transport food and/or beverages from the work area to the hospitality area.

Description of the Related Art

One related such restaurant system is known, for example, from EP 1 833 331 B1.

What is understood here by a restaurant system is not only systems for restaurants in the narrow sense, but very generally systems for all kinds of gastronomy, thus, along with restaurants and guest facilities, also mobile or fixed snack stands, beer gardens, fast food restaurants and drive-in restaurants. Additionally what is understood with a restaurant system is also a movable serving wagon, which can be pushed in restaurants or children's hotels from table to table in order to serve the food and/or beverages in spectacular fashion via a loop-the-loop running on or at the particular table. Also generally understood as a restaurant system are movable serving and snacking systems, for example as trailers or as systems designed as autonomously moving devices, with appropriate setup in accordance with the invention.

The work area for example is an area that comprises a kitchen and/or bar. With a snack stand it also can merely be a simple place for preparing or readying of food and/or beverages. Additionally, the work area can also simply be the area in which food and/or beverages are placed on the conveyance system, as can be the case for example with the serving wagon mentioned previously.

The hospitality area is the area in which the customers of the restaurant, snack stand, beer garden, etc. stay. Usually there are tables and chairs here. But it can also be a stand-up facility or a drive-in area, where customers have their food and/or beverages delivered to them. What is understood as a hospitality area is also, for example with a snack stand, a simple place of distribution of food and/or beverages, at which the customers get their food and/or beverages.

As with the restaurant system known from EP 1 833 331 B1, food and/or beverages are transported from the work area to the hospitality area at least in part by gravity. For this, according to the above-named publication, the kitchen is situated at a location elevated relative to the hospitality area, which is not always possible due to particular spatial features.

Also known is a restaurant system with a device adjoining the work area that overcomes height difference such as an elevator, which is described in DE 10 2013 102 674. Here the emphasis is on a conveyance system to the hospitality area or to the particular place of a customer with an elevator, which is designed to transport the food and/or beverages to a location higher than the hospitality area, through which the actual work area, namely the kitchen, does not necessarily have to be situated in toto in a location higher than the hospitality area.

According to the known designs of restaurant systems, a distribution platform is situated in an elevated position above the hospitality area to which the food and/or beverages are delivered by an appropriate elevator, a bag conveyor, a conveyor belt or the like, and there taken by an employee. The food and/or beverages are then placed by an employee on one of a plurality of transport rails or the like provided for this, which lead from the distribution platform to the appropriate defined customer sites.

What is disadvantageous with the known embodiments of the restaurant systems in question is the requisite size and height of distribution platforms in which employees distribute the food and/or beverages onto conveyance devices provided and described for this or to the conveyance systems from the distribution platforms to various customer locations. With this, a plurality of rails lead from the distribution platform to corresponding customer locations or customer tables onto which the food and/or beverages are appropriately positioned by an employee on the correct rail. Along with high labor costs, especially the exacerbated working conditions are often problematical, such as restricted spaces and temperature and/or air conditions at the distribution platform above the kitchen and/or hospitality area, or are not reasonable for the employees. It also repeatedly happens, especially in stressful situations, that the employee takes food and/or beverages that are identified by table numbers and erroneously places them on the wrong rail, and thus they are transported to a wrong table and/or guest. Also not to be precluded are extreme cases of accidents on the distribution platform due to adverse conditions such as a conveyance device not correctly seated onto the rails and/or conveyance systems.

One such restaurant system is known, for example, from EP 1 833 331 B1.

ASPECTS AND SUMMARY OF THE INVENTION

One aspect and object of the present invention is to provide a new restaurant system, especially a restaurant system in which the work-kitchen area itself does not need to be elevated over the hospitality area and the distribution area makes fewer demands on space and height, as well as transport that is optimized, spectacular, and considerably optimized in its efficiency, of transporting the defined food and/or beverages to the appropriate customer table.

This object is achieved by the features as noted herein.

According to the invention, a restaurant system, comprising at least one work area for cooking and/or preparation of food and/or beverages and at least on hospitality area, wherein the work area and hospitality area are connected by at least one conveyance system for food and/or beverages, and wherein the conveyance system is designed to transport food and/or beverages from the work area to the hospitality area in conveyance devices provided for this, wherein the conveyance system comprises one or more rails, especially gliding rails, preferably gliding rails with a glide surface, or roller rails or roller paths or tubes for transport of the food and/or beverages, and the food and/or beverages in their conveyance device are provided with at least one clear, electronically readable identification, generated in the work area, and the conveyance system downstream of the work area has at least one distribution section in which the food and/or beverages are delivered by means of the identification, targeted to or on a further conveyance system from the distribution section to the hospitality area.

Preparation and subsequent transport of the food and/or beverages is preceded by an ordering process, which preferably is activated by the guest at his table via an appropriate ordering terminal or via a special interface via an electronic input device. With this, a connection is allowed to be made between the restaurant system's IT network and a customer's electronic device, such as a smart phone or another computer device with access authorization, and arranged as to by which one the payment can be done. The orders, regardless of in what form, are passed to the work area, the kitchen area, where they are given a unique identification, which especially indicates the ordered food and/or beverages as well as the place, seat or location of the customer, from which the order was placed. In some versions the identification includes additional data such as the type of food and/or beverages, and whether these can be transported in a cup or a glass, whether these can be delivered via any kind of rails, for example a loop-the-loop or a catapult starter. Additionally, data on special orders, such as making a cocktail or special designation of the food and/or beverages for birthdays or other events if needed, is used.

Customer orders are divided up in the work area into units to be delivered, which can be transported in conveyance devices or on the conveyance systems, wherein the food and/or beverages can be placed in receptacles in the conveyance device, set up or delivered in appropriate holders, such as for bottles. The receptacles for the food and/or beverages preferably are secured from falling out or spilling, as well as from unintended opening during transport.

Preferably the conveyance system has two rails that in essence run parallel to each other. The food and/or beverages are transported with the aid of conveyance devices. For this, the food and/or beverages which are to be transported, which are in suitable receptacles such as bowls, bottles, glasses, glasses with screw tops or fast food packaging, are placed into the conveyance devices.

Preferably the rails of the conveyance system are gliding rails with a glide surface, for example at least essentially round or oval in cross section, or rectangular rails. In corresponding fashion the conveyance devices preferably have slide bases and/or sliding devices which are designed for transport of food and/or beverages and correspond with the gliding rails in regard to their dimensions and/or their gliding properties. In variants or embodiments of the invention-specific restaurant system, the gliding rails are also replaced by roller paths and/or tubes, or combined with such roller paths and/or tubes. For delivery of beverages in bottles and/or glasses, such as cocktails, direct transport in a tube is provided, which is designed as an additional or alternative transport path and/or conveyance system.

Especially when the routes to be covered are very long, or in cases in which only slight inclines are possible in the building, at least partial transport on and/or via roller paths can be optionally implementable. Spectacular roller paths can also be used in that the conveyance device, in order to overcome height differences, goes back and forth in zigzag fashion and thus is similar to a marble race where a piece drops down and changes direction. With this, in combination the roller paths and/or glide rails are arranged and implemented in such a way that the conveyance devices can run on flat sections and roller paths, and at a transfer point be switched onto glide rails and pass over.

The containers for food and/or beverages and/or the conveyance device used are provided in the work area with a clear identification at least electronically readable, which preferably, along with the electronic identification, like Request For Delivery (RFD) means or other carriers, also is designed as a printout with a bar code and/or a clear-text description of the food and/or beverage. Thus one or more reader devices installed in the transport path, such a scanner, transponder reader or the like, can do a readout of the identification and the customer, using the text, can quickly identify the food and/or beverage. The identification of the particular food and/or beverages or conveyance device with the food and/or beverages can be further processed by a computer or data network in the restaurant, or transmitted onward. The food and/or beverages in the conveyance device, after application or attachment of the identification, are transported from the work area to a distribution area. For this, the conveyance devices are seated in according to the named prior art into a rail system or placed on same and transported onward. In a preferred embodiment, the conveyance devices as per the prior art are equipped with glider feet, which extend a good way around the transport rails, which ensures sufficient holding and stability during transport. In areas in which the conveyance devices are inserted into the rail system, or are able to be removed from same, the rails in this section are designed with a smaller, reduced diameter, through which the glide feet are placed over these areas and through sliding in or continued sliding of the conveyance device are guided onto the rails that are normal in diameter, thus configured larger. With this, the glide feet of the conveyance device again surround the rail in the area of larger diameter in order to have sufficient holding, and be secured against tipping and dropping out or skipping.

Since each two glide feet engage around the two rails that preferably run parallel, then when inserting the glide feet, it is important for glide feet to be parallel to ensure simultaneous insertion of both glide feet. For this, preferably also the robot arm has fixing elements that are ensured to keep the glide feet parallel when placing these on the rail elements and removing them from them, and ensure that when slid in, both glide feet grip around the particular rail and ensure secure holding during the trip.

In the adjoining distribution area, or already upon leaving the work area or at a suitable location between the work and distribution area, the food and/or beverages are recognized using their applied or attached identification, and, by means of an automatic distribution device, using the data in the computer or data network, are moved, redirected or transported on a conveyance system running to a selected customer location in the hospitality area.

According to a preferred embodiment of the invention, the food and/or beverages are delivered or moved on or in their conveyance devices upon arriving in the distribution area or at a positionally defined starting and/or removal location. Preferably this food and/or beverages are transported on or in their conveyance devices by an appropriately selected inclination of the transport rails, which the conveyance devices reach in the distribution area. The positionally defined start and/or removal location makes possible for one thing that the conveyance devices are held for removal and/or engagement by the robots in such a way that the glide feet and/or their guides are held in an exact position. For this, an element on the gripping device of the robot arm engages into the round guides of the glide feet of the conveyance device, to make a defined fixing of these upon removal from the rail. In the interior of the round guides of the two glide feet located on the two positionally defined start and/or removal locations on the rails, there are round segments of dividing fins, into which the gripping device of the robot engages, though which the glide feet are aligned so as to be torsion-free in a defined direction. Through the gripping device the conveyance devices that have food and/or beverages on them are derailed from the positionally defined start and/or removal location and again seated in at another location with no difficulties.

Arriving at a positionally-defined start and/or removal location, the particular conveyance device is further guided by a distribution device, which preferably is equipped with at least one robot and/or robot arm integrated into the data and/or computer network, to an additional conveyance system leading from the distribution area to the particular defined hospitality area or customer table.

Using the identification the information is passed to the robot or robots and/or robot arms, regarding to which position and/or to which rail the corresponding conveyance device must be positioned for further transport.

With this, preferably the conveyance device is uncoupled at the positionally defined start and/or removal location from the rail or the transport path, and picked up by a robot arm, which is equipped with takeup means for gripping the conveyance device, and placed on a rail or a transport path from the distribution area to the particular defined customer table in the hospitality area, seated in, pressed in or on the rails and/or directed further.

In the distribution area, a plurality of conveyance systems and/or rail systems run together to the customer tables in question or places in the hospitality area, which as a rule are so configured that the conveyance devices with the food and/or beverages are transported at least in part by gravity from the distribution area to the hospitality area. Preferably, for one or more customer places there are also transport paths that allow an especially spectacular transport of food and/or beverages, such as traveling via at least one loop-the-loop or launching with a catapult drive.

Using the identification of the food and/or beverages that is generated in the work area during ordering, it is also determined whether the food and/or beverages in question are suitable to be transported via a loop-the-loop and/or by a catapult launch. For example, some foods and/or beverages are in danger of spilling or spraying out due to forces that appear in a loop-the-loop or with a catapult launch, which must be avoided. This information is passed on via the data and/or computer network to the distribution device and/or the robots or robot arms and is taken into account when positioning the food and/or beverages in question for further transport.

In a preferred embodiment of the invention, in the distribution area, two or more robot arms are situated, the first of which removes the conveyance devices at the positionally defined start and/or removal location from the first transport path from the work area to the distribution area and then passes same directly or indirectly to a second robot or robot arm, which places and/or inserts the conveyance device on the further transport path from the distribution area to the hospitality area.

It could also be that this first robot itself serves a certain number of rails that run from the distribution area to the customer tables, in that it itself seats onto the rails the transport devices that are ordered for these rails for further transport to the hospitality area. All of the conveyance devices that do not lie on continuing rails in the work area of the first robot are passed by it to one or more additionally provided robots in the distribution area. This passing on can either occur directly in such a way that the conveyance devices are diverted off by robot 1 at a defined point, for example to a section of rail where the second rotor can in turn engage them with an appropriate gripping tool, to distribute them onto the rails in its work area or working radius. But it also could be that robot 1 could place conveyance devices that do not lie in its working radius on a rail that continues, where the conveyance devices first move on for a while on glide rails and/or roller paths to the work area of the next robot. Here ideally again there would be a positionally defined start and/or removal location, where robot 2 or robot 3, etc. can remove the conveyance devices by means of a gripping tool.

Through use of two or more robots or robot arms, for one, a larger activity radius can be covered in the distribution area, and for another, by means of indirect transfer from one robot arm to another, a buffer area for food and/or beverages in their conveyance devices can be created, by which delivery peaks can also be better cushioned.

The buffer area for conveyance devices which are passed from one robot arm to another, can be designed with differing dimensions, such as for example a pure start rail or incline on which the first robot arm takes it off and the second picks it up, or be designed with a larger buffer as a spiral or a storage area configured differently.

Preferably the conveyance devices in such a buffer area are so arranged that they can be moved with no further mechanical drive force, for example by appropriate upward or downward inclines, and be moved by an additional robot arm at the positionally defined start and/or removal location in a defined end position.

Also a buffer can be used in dependence on loading and/or need, wherewith the conveyance devices which are removed by the first robot arm from the first transport path, can be transferred to the buffer in instances when the restaurant is very busy or for other needs. When it is not so busy, the first robot arm can effect a direct transfer of the conveyance devices to the second arm.

Since, for one thing, the frequency of orders in the hospitality area, and for another, the controlled capacity of the robot arms, especially through the usable buffer, permit free times for the second robot arm or for all of the arms simultaneously, these can be programmed during such free times with various show options. These can for example be preset dancing or exercise routines with and/or without music and/or light effects such as lasers and the like, to make delivery of food and/or beverages even more spectacular.

In a further embodiment, the first robot arm is so arranged that it engages the conveyance device directly at a defined location of the working area and can transport it on to an additional robot arm or into the buffer area in the higher position on the distribution area. With appropriate structural particulars, a device to overcome height differences such as a bag conveyor or elevator in the conveyance system from the work area to the distribution area can be done away with, or such can be replaced by one or more robots and/or robot arms. In this embodiment variant, either in the work area before and/or at the pickup location, a reader device for identification can be arranged, or at least the first robot arm itself has available such a reading device and reads the identification in question before takeup and further direction of the conveyance device in question. Naturally, when overcoming larger height differences from the work area to the distribution area, multiple robots switched in series can pass the conveyance devices from one to the next robot via defined turnover points, until they reach the turnover point in the distribution station.

According to another embodiment version, the restaurant system according to the invention can also comprise a braking device, by which the food and/or beverages can be slowed down in the transport section from the distribution area to the customer table, particularly at or near the end of this transport section, and in particular be slowed to a defined speed. For example with restaurant systems that have loop-the-loops, as described above, this proves to be especially advantageous, since otherwise the food and/or beverages could arrive too promptly and thus in uncontrolled fashion in the hospitality area.

Provision is also made that in the entire area of the restaurant, and on special transport paths selected in the area, special lighting devices and/or light shows can be provided. Here the delivery of food and/or beverages could be made still more spectacular, if for example the delivery of food and/or beverages could be on a rail with one or more loops. For example the light in the restaurant is briefly dimmed, and along the rails on which it is to be delivered, a lighting scenario like a progressive sequence and/or running lights could be run, which could accompany and/or illuminate the food and/or beverages on their trip. The same can occur in the case of delivery via a catapult drive; here the customer is additionally involved in that he can initiate the launch from a signal like a buzzer at the table. The launch can be accompanied or supported by smoke effects with light and/or sound effects which in turn contributes to a very spectacular delivery and increases the entertainment value of the restaurant.

Additionally, all of the described devices and configurations can be combined with each other or be arranged to follow one another multiple times. For example, the conveyance devices in the distribution section, which already is at a position higher than the hospitality area, can be placed by a robot into an elevator or conveyor, to bring the conveyance device to a still greater height for an alternative, very steep and spectacular transport path. An EDP and/or data network can inform as to which conveyance devices are suited with which food and/or beverages for what type of delivery, and the robots and/or robot arms are guided accordingly. Also, in large restaurant buildings, several distribution sections can be arranged at various heights, to implement as many options, and as rich in variants, of transport paths as possible. Also, various conveyance systems can be combined in one restaurant and the various foods and/or beverages can be delivered via alternative conveyance systems. For example, beverages can be delivered in bottles or glasses, and also cocktails, with or without conveyance means, to the customer's table in parallel-configured tubes, or also provided at a bar area. The tubes are preferably transparent or partially transparent and made of plastic, so that their inner surfaces themselves serve as glide surfaces. All of the components contributing to the system are networked with one another and/or networked with a central control unit, and optimized as per the possibilities of automation technology to be centrally controllable, which reduces danger of accidents to a minimum and optimizes possibilities for control.

Also, individual groups or elements of the invention-specific restaurant system can be designed separately to convert into restaurant units. As an example, a truck trailer could be used a pure cocktail mixer, show and entertainment trailer for fairs, in or outside of party tents, or also for plant celebrations or the like. In the trailer there would be one or two robots, which automatically mix the cocktails and deliver them out to customers along short stretches of rail. Something like this could also be installed permanently in restaurants. From a dispatching and/or distribution area, a rail leads to a bar in the hospitality area about which customers take their places. Two robots mix cocktails and then send them over short sections of rail to the customers who sit around the bar. Further, from this bar, conveyance systems like rails can be run to several or to all of the tables in the hospitality area. Thus in this variant, two rails and/or rails combined with tubes or other conveyance systems lead to customer tables, one directly from the kitchen with food and beverages, and one from the bar area with the cocktails.

The invention will be explained in what follows, regarding further features and advantages, using the description of embodiments with reference to the appended schematic diagrams.

DETAILED DESCRIPTION OF THE PREFERRED EMBODIMENTS

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Figure 1:
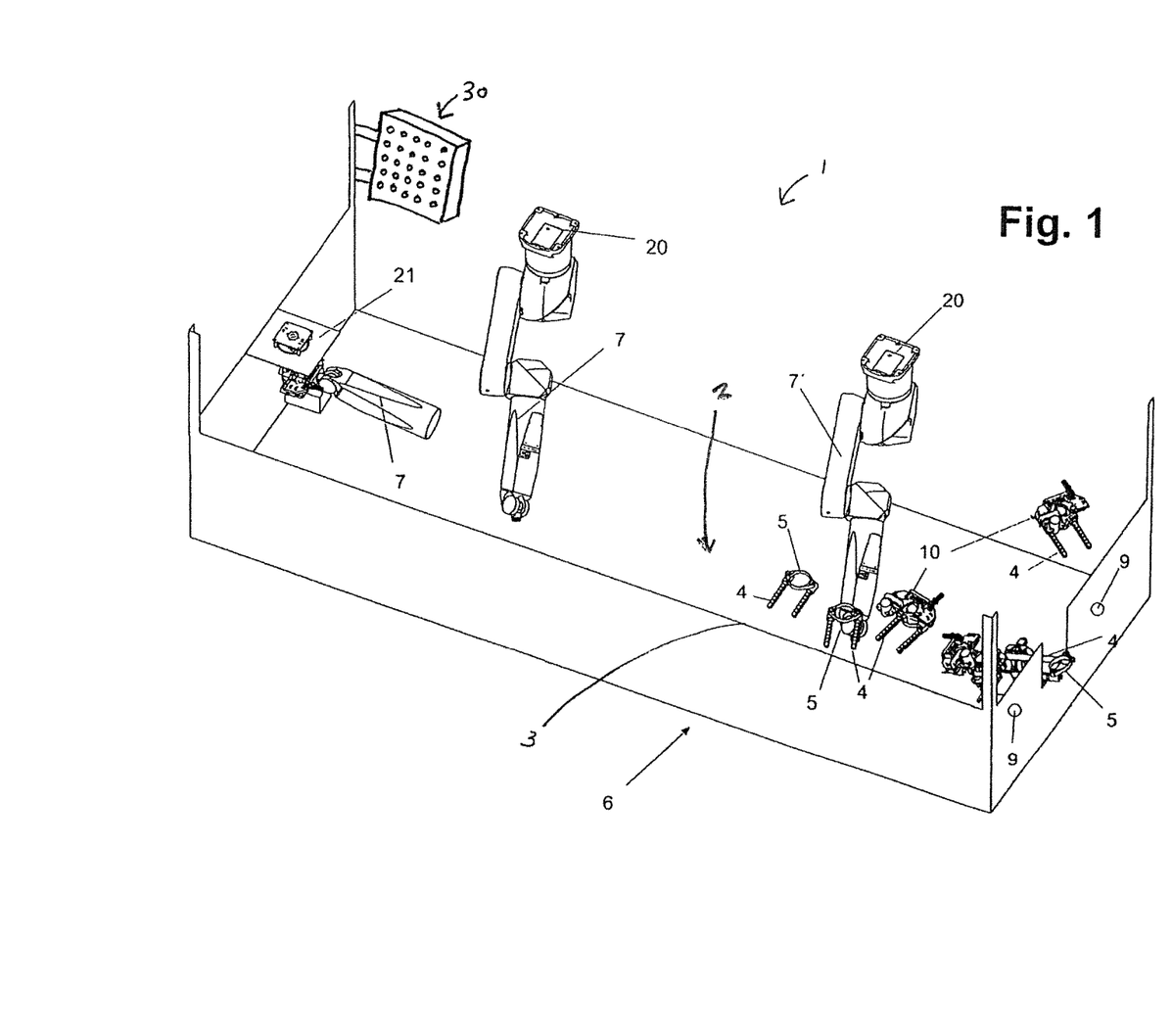
FIG. 1: a schematic depiction of a distribution area with and automated distribution device and handling means and devices.

One of the present inventions is FIG. 1 which schematically shows a restaurant system 1 shown relative to a work area 2 and a hospitality area 3, the restaurant system including a distribution section 6, which is equipped with an automatic distribution device, which, as shown here, has available at least two robot arms 7, 7', which are connected with a central EDP and/or data network, of the restaurant system and are driven by an appropriate control along with the required sensors and/or sensor technology. Distribution section 6 is arranged to adjoin a work area such as a kitchen, and upstream from the hospitality area and is as a rule situated above the work area and/or the hospitality area. The elevated position or the distribution area, at least to the hospitality area, is a preferred embodiment variant, since gravity is used at least in part to transport food and/or beverages on the conveyance system 4, from the distribution section to the hospitality area, i.e. the tool and/or beverages are delivered by gravity in their conveyance devices 5 on rails 4 or also roller paths from distribution section 6 to the hospitality area. In numerous instances, it is not possible to situate the working area at the elevated position of the distribution section, due, for example, to structural limitations, and for this under such conditions, between the working area and distribution section 6 a position-raising device is provided in the transport path and/or conveyance system from the working area to the distribution section. This is done for example by an elevator, a bag conveyor or some other suitable device such as a robot or robot arm. This can be done as per the design according to FIG. 1 by a robot arm 7, 7', which is appropriately dimensioned for this and equipped with a telescoping device in one section, thus reaching down into the work area. Starting from this distribution area 6, a plurality of rails 4 are arranged to diverge, which run to the particular tables or places in the hospitality area. Provision may also made that in the entire area of the restaurant, and on special transport paths selected in the area, special lighting devices 30 and/or light shows can be provided.

In the work area, the food and/or beverages are provided with a clear identification that is able to be read at least electronically, which especially indicates the ordered food and/or beverages and the place, seat or location of the customer from whom the order was received. The food and/or beverages thus designated in their receptacles and/or packaging units are placed in and/or on conveyance devices 5 and the conveyance device is guided along a transport path or via a conveyance system 4' to distribution section 6. In this path or system, preferably one already named device to overcome height differences is included to lift the food and/or beverages to the level of the distribution section. According to FIG. 3, the conveyance devices are configured as devices for bowls or according to FIG. 3a as devices for bottles or glasses, and adapted in shape and size to the vessels to be used. At least before the entrance into distribution section 6, depicted all the way to the right in FIGS. 1 and 2, the food and/or beverages on conveyance device 5, along the entering conveyance system 4' are identified by readout using at least one reader device 9 for identification, and the information about this is transmitted to the central network, all participating sensors and the robot or robots and/or robot arms. An appropriate reader device for identification of the food and/or beverages and their receptacles is also arranged in one embodiment of the invention in the area of the gripping device 10 of at least one robot arm 7, 7'.

Figures 2, 3, 3A:
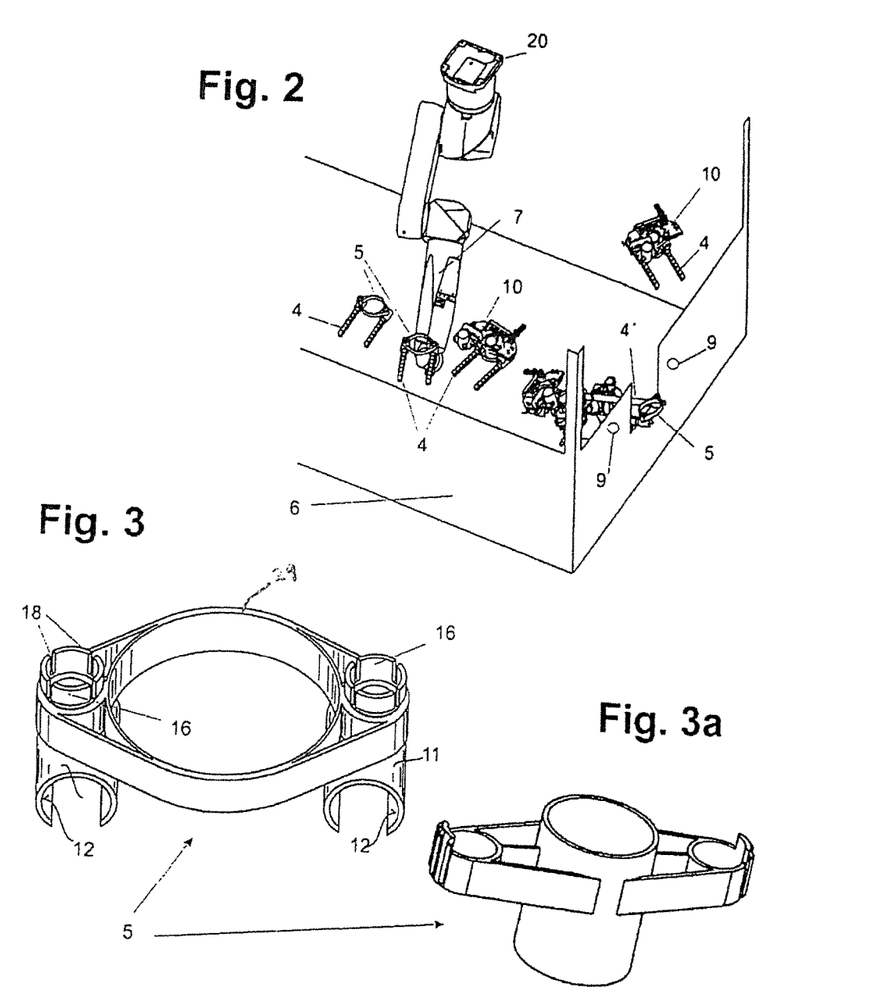
FIG. 2: a section of the distribution section shown in FIG. 1.
FIG. 3: a conveyance device for food and/or beverages.
FIG. 3*a*: a variant of the conveyance device especially for glasses and bottles.
Figure 4:
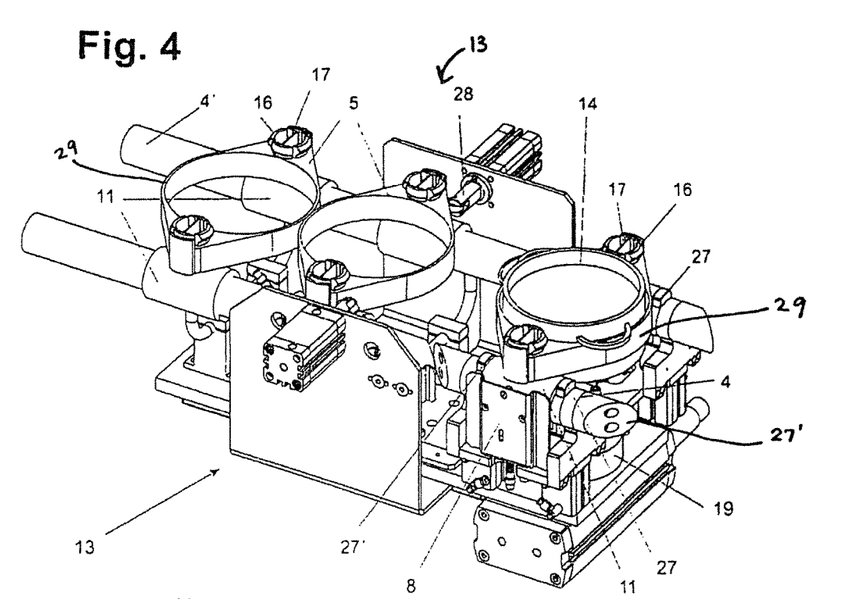
FIG. 4: a depiction of the start position with a positionally-defined location for removal and/or further conveyance of food and/or beverages.
Figure 5:
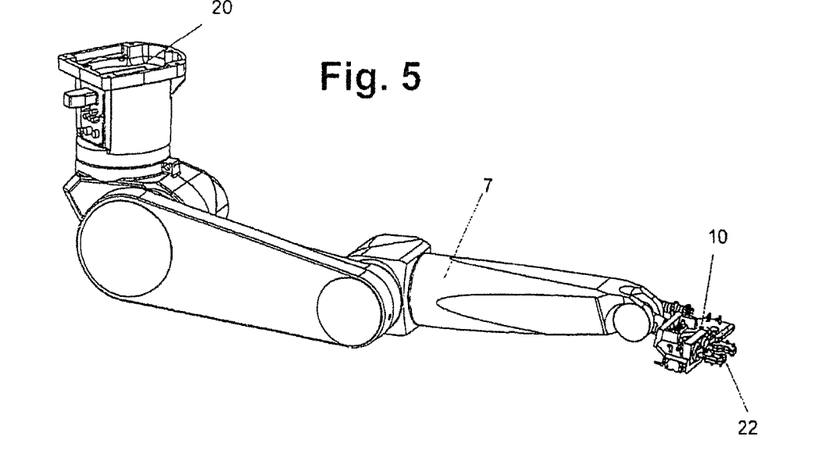
FIG. 5: a robot arm with a gripping device.

As FIGS. 1 and 2 show, the food and/or beverages get into their conveyance devices 5, which are moved from the work area to the distribution area on the running rails 4 or conveyance system in the entry area to the distribution system via rails 4', which are inclined, into the distribution area. From there the conveyance devices go safely on the rails, with no additional propulsion, into a position-defining device 13, also called a separator, which is seen in FIG. 4.

In this device 13 there is a positionally defined start and/or removal location 8, at which conveyance device 5 can be removed in defined fashion by a robot arm 7 with its lifting means or gripping device 10. The gliding feet 11 of conveyance device 5 shown in FIG. 3 are removed from the rails 4, 4' also running in separator device 13. Before and behind the two gliding feet at the removal site 8 for the conveyance devices, stoppers 27 are slid hydraulically or electrically from below through rails 4", in such a way that first the outermost stopper 27 (at the end of the separator) is pressed through the rails as a kind of end stop, before a conveyance device 5 can enter in this area. Then a conveyance device is released by lateral stopper 28, likewise driven hydraulically or electrically, which holds all following conveyance devices at a distance, so that always only one single conveyance device can move to end stopper 27 of separator 13 and can be removed and not be able to be torn out by conveyance devices further overlapping the robots upon removal.

If conveyance device 5 has reached end stopper 27, also the other bolts 27' are compressed from below through the rail, to pull glide feet 11 into a clear end position, where gripping tools 15 of the robots can engage into the glide feet.

The two bolts can be configured advantageously to be conical, so that when these emerge from the rail, they do not hereby press out glide feet, which still are not at the stop of the first bolt.

If the conveyance device is then in the final position and if the gripping tool has engaged the conveyance device, the end stop bolts are drawn downward through the rails and the conveyance device is then removed from the rail. In this version, this section of the rail is not reduced in diameter.

Upon takeup of conveyance device 5 by gripping device 10 of robot arm 7, it is important to take care that a later placement and/or seating of the conveyance device on a rail 4 or roller path from the distribution section to the hospitality area be possible with no problems. With seating of conveyance device 5 on the rails 4, it is very important to have parallel alignment of the glide feet 11, which are seated into the rails 4. To ensure this, in a preferred embodiment, gripping device 10 of the robot arms is equipped with alignment means 15, which, upon engagement of gripping device 10 into conveyance device 5, fix glide feet 11 in their parallel aligned position on the rails. In the interior of the round guides 16 of the two glide feet 11 situated parallel in the positionally defined start and/or removal location on the rails, are found the round segments 16 of dividing fins 17, into which the gripping tool of the robot engages with its alignment means 15, through which the glide feet are aligned in a defined direction and cannot be twisted. Alternatively, an appropriately divided alignment means can engage in notches 18 of rounded segment 16, as shown in FIG. 3. By means of the gripping tool, the conveyance devices which are supplied with food and/or beverages are gripped from the position-defined start and/or removal location and seated.

In FIG. 4, conveyance device 5 for removal by the gripping device of the robot is shown with a set-back pair of rails 4" which in addition is attached to a rotary device 19. Rotary device 19 allows for a turnaround of the food and/or beverages on their conveyance device 5. This is desirable because bowls 14 on conveyance device 5 are equipped with a lid, which preferably is secured by a band or a flap against falling down. In one variant, such a band is securely attached to a circumferential collar 29 of the conveyance device and is placed in tension via the lid of bowl 14 and suspended on the opposite end of the circumferential collar with a hook provided in a holder provided for this on this side of the circumferential collar. To be able to ensure that a container such a bowl 14 reaches the customer in the conveyance device in the desired position, namely with its suspended end turned toward the customer, complete conveyance device 5 can be turned before pickup by means of the gripping device on rotary device 19. Thus, the customer can easily open the securing band, which arrives with its hook element directed toward him, by unhinging the hook element and removing the food and/or beverages delivered to him.

Figure 6:
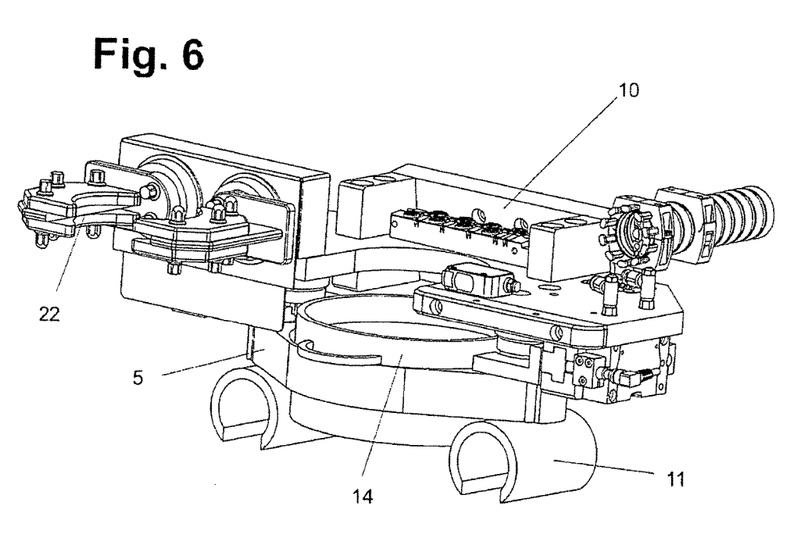
FIG. 6: a gripping device with conveyance device picked up.
Figure 7:
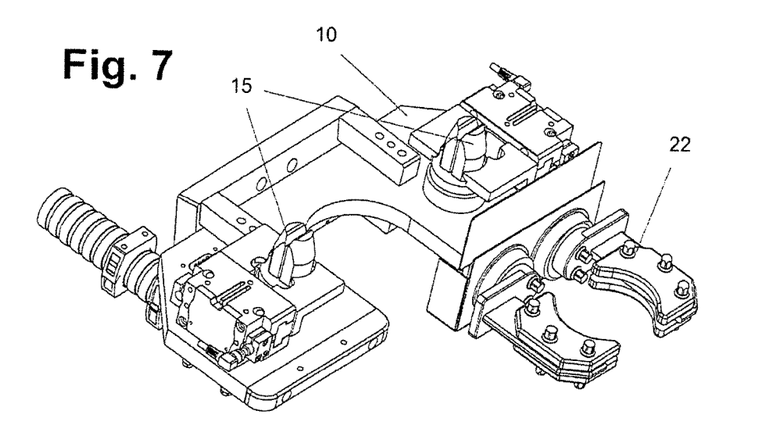
FIG. 7: a gripping device for food and/or beverages in conveyance devices and/or receptacles.

In a further, preferred embodiment of the rotor or robots and/or of the robot arms in the distribution section, at least one robot arm has available a gripping device or a takeup device with additional gripping pliers 22. With the additional pliers as are seen in FIGS. 6 and 7, with semicircular recesses, gripping device 10 can also directly grip, lift and move containers like glasses, bottles, the knob of a lid or other vessels 26. To offer still more spectacular robot activities, in a further variant, the distribution section is equipped with multiple handling and/or dispensing devices 21, which, as indicated in FIG. 1, are situated somewhat to the side of the distribution unit. By means of such handling and/or dispensing devices 21, the robot system can for example prepare or mix cocktails, and also drain beverages from dispenser devices in the containers 26 and close them with a lid 24 before they are sent in conveyance device 5 on their way to the correct customer location via the transport rails 4 in question. For this sequence such as cocktail mixing, based on an order, in the work area of an employee in the kitchen, a closeable glass that is empty or filled with ingredients can be placed with a glass closeable by a screw lock into the conveyance device in question and the pertinent identification applied. Based on the identification, the conveyance device with the glass that is empty for example is detected and the robot removes glass 26 with screw-on lid 24 at the positionally defined start and/or removal location 8 by means of its gripping pliers 22. Alternatively a first robot can remove the detected conveyance device provided with the glass for further processed at an intermediate location where a second robot undertakes the further processing. The further processing then makes provision that the glass or receptacle 26, gripped and removed from the transport device, via handling device 21, as is shown for example in FIGS. 8 and 9, by means of rotating rollers 25 or wheels is screwed on, with screwed-on lid 24 held securely by the handling device. Alternatively, the handling device can also solely carry out a holding function and the screwing motion is totally undertaken by the robot arm.

Figure 8:
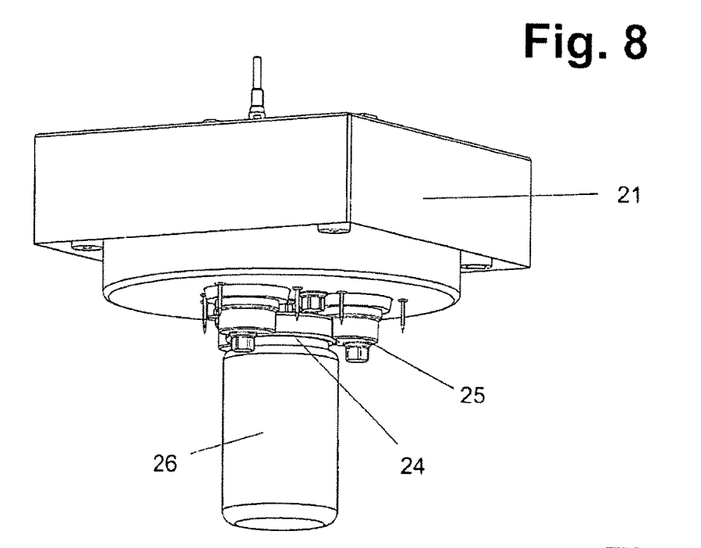
FIG. 8: a closed handling device for receptacles.
Figure 9:
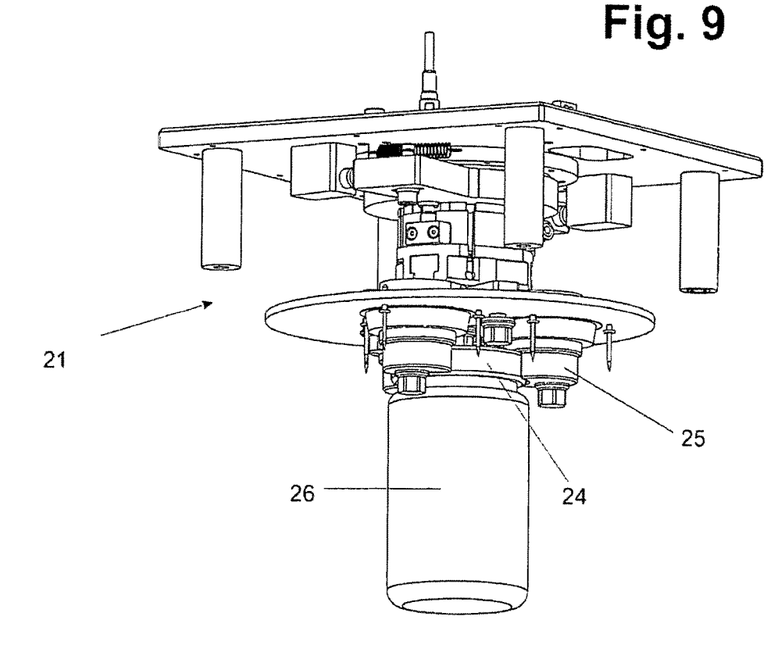
FIG. 9: an open handling device for receptacles.

The opened glass or receptacle is filled by a dosing device beneath which it is positioned by the robot arm, and then glass 26 is again positioned by the robot beneath handling device 21 and lid 24 of the device is screwed on. Now, by appropriately programmed motions of the robot arm, the cocktail is spectacularly prepared by a robot, then placed back into the pertinent conveyance device and this is seated onto the assigned rail or transport path 4 to the customer in question, and delivered, or the glass is positioned directly into an alternative transport path like in a rail, to the customer table.

The ingredients needed for the cocktail are taken from the appropriate dispensing device or issued by a dosing device in which ice for cocktails is also contained. Also, robots are programmed to grip bottles with attached dispensers from robots and to fill the described glass for the cocktail.

As an alternative to this, it is also possible that a robot or a robot arm holds the glass with the lid screwed on and a second robot and/or robot arm unscrews the glass, also with the gripping tool, and then after the filling process screws it on again.

The robots and/or robot arms can fundamentally be mounted on the wall, on the base or on the cover, with cover mounting being the preferred embodiment, since the arms can thus be completely pivoted away for maintenance and/or cleaning tasks. Also for cases of down time, there is unhindered access to all areas of the distribution section.

After the preferred embodiments of the invention have been described in reference to the appended drawings, it is determined that the invention is not limited to these exact embodiments, and that various alterations and modifications to them can be carried out by one skilled in the art without departing from the scope of the invention, as it is defined in the appended claims.

LIST OF REFERENCE SYMBOLS

1 Restaurant system
2 Work area
3 Hospitality area
4 Conveyance system
5 Conveyance device
6 Distribution section
7 Robot (arm)
8 Positionally defined removal location
9 Read and identify device
10 Takeup means gripping means
11 Glide feet
12 Glide surface
13 Separator device
14 Bowl
15 Alignment device
16 Round guide
17 Dividing fin
18 Notches
19 Rotary device
20 Suspension device
21 handling device
22 Gripping pliers
24 Lid
25 Locking device
26 Glass/container
27 Stopper in rails
27' Alignment bolt
28 Lateral stopper Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

The invention claimed is:

1. A restaurant system, comprising:
   at least one work area defined at a location distant from at least one hospitality area;
   wherein said work area is operable for the preparation of at least one item selected from a plurality of food items and beverage items;
   a conveyance system operable to transport said at least one item from said work area to said hospitality area in at least one conveyance device, the at least one conveyance device being releasable by a lateral stopper;
   wherein a unique electronically readable identification in said work area is securable to said conveyance device;
   said conveyance system, further comprising:
      at least one of a set of gliding rails with a glide surface, a set of roller rails, a set of roller paths, a set of tubes;
      at least one said unique electronically readable identification;
      an automated distribution device conveys said conveyance device in a downstream direction from said work area to a distribution section to said hospitality area using said at least one unique electronically readable identification, wherein:
      said automated distribution device further comprises:
         at least one robot included in a communicating computer network and at least one robot arm, at least one of said robot and said robot arm further comprising a pickup means that moves the conveyance device from a positionally defined start and removal location to one of another location and another second conveyance system, the pickup means engagable with the tubes of the conveyance system; and
         at least one positionally-defined start and removal location along said conveyance system configured to engage said at least one conveyance device, wherein:
      said set of gliding rails is designed as a section of rail having an outer dimension with two parallel profiles, over which glide feet of said conveyance system at least partially surround said two parallel profiles, round segments extending orthogonally from the glide feet, the round segments including at least one of a dividing fin and notches defined within the round segments; and
      said two parallel profiles extend from one of said work area and said positionally defined start and removal location along said conveyance system;
      said two parallel profiles have a lesser diameter that is less than said outer dimension thereby enabling a removal of said conveyance device from the rail during a use;
      a circumferential collar secured to the round segments, the circumferential collar being configured to receive a bowl.

2. The restaurant system, according to claim 1, further comprising:
   at least one reading and identification device reading said unique electronically readable identification on a designated said item along said conveyance system;
   said at least one reading and identification device located in an intermediate position of said restaurant system along said conveyance system;
   said intermediate position located between at least one of said work area and said distribution section and between said distribution section and said hospitality area; and
   said reading and identification device conveying said unique electronically readable identification for said designated item to said communicating computer network and said at least one robot.

3. The restaurant system, according to claim 2, wherein: the conveyance system, between the work area and the distribution section, further comprises:
   a height difference device to overcome a height difference between said distribution section and said conveyance system.

4. The restaurant system, according to claim 3, wherein: said height difference device is at least one of a robot, a robot arm and a robot system.

5. The restaurant system, according to claim 3, wherein: said hospitality area further includes a plurality of designated target points operably linked along said conveyance system.

6. The restaurant system, according to claim 5, wherein: said conveyance system further comprises:
   at least one section wherein said items are transported from said distribution area (6) to at least one designated point in said hospitality area by gravity.

7. The restaurant system, according to claim 5, wherein: said conveyance system further comprises:
   an acceleration device is arranged to accelerate the at least one item downstream along said conveyance system.

8. The restaurant system, according to claim 5, further comprising:
   at least one loop-the-loop section in said conveyance system;
   said at least one loop-the-loop section between said starting point and said hospitality area.

9. The restaurant system, according to claim 5, further comprising:
   at least one braking device on said conveyance system between said distribution section and said hospitality area.

10. The restaurant system, according to claim 5, further comprising:
    a catapult drive on said conveyance system between said starting point and said hospitality area; and
    said catapult drive operable to accelerate a distribution of said item along said conveyance system during said use.

11. The restaurant system, according to claim 5, wherein: said distribution device is first level that is elevated from a hospitality area on a second level.

12. The restaurant system, according to claim 5, further comprising:
    a lighting system that emits a light during a use;
    said lighting system being operatively controlled by a data network.

13. The restaurant system, according to claim 5, wherein:
    at least one of said robot, said robot arms, and said distribution being operatively designed to provide an additional feature during said use; and
    said additional feature being one of a show performance and a mixed beverage.

14. A method for operating a restaurant system, comprising the steps of:
  providing a restaurant system according to claim 1;
  generating an identification of said item based upon receipt of an order;
  making said item and positioning said item in said conveyance device;
  generating said unique electronically readable identification for said item;
  applying said unique electronically readable identification to said conveyance device;
  positioning said conveying device on said conveyance system from said work area;
  providing a reader for said unique electronically readable identification and reading of said unique electronically readable identification;
  pushing said conveyance device with said item to one of a positionally defined start location and a removal location;
  removing said conveyance device from said conveyance system by said one of said robot system and said robot arms at said removal location;
  determining a suitable transport path of the conveyance device along said conveyance system to at least one designated individual point in said hospitality area,
  replacing said conveyance device onto said conveyance system by one of said robot system and said robot arms; and
  illuminating a second of said conveyance system during a transport of said conveyance device from said distribution section to said hospitality area.

* * * * *